(12) United States Patent
Messick et al.

(10) Patent No.: US 11,822,418 B2
(45) Date of Patent: Nov. 21, 2023

(54) SYSTEM AND METHOD FOR POWER CONSUMPTION MANAGEMENT

(71) Applicant: Dell Products L.P., Round Rock, TX (US)

(72) Inventors: Douglas Evan Messick, Austin, TX (US); Craig Anthony Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 107 days.

(21) Appl. No.: 17/536,913

(22) Filed: Nov. 29, 2021

(65) Prior Publication Data

US 2023/0168731 A1    Jun. 1, 2023

(51) Int. Cl.
| | |
|---|---|
| *G06F 1/3296* | (2019.01) |
| *G06F 1/3206* | (2019.01) |
| *G06F 11/30* | (2006.01) |
| *G06F 1/3215* | (2019.01) |
| *G06F 1/3228* | (2019.01) |
| *G06F 1/324* | (2019.01) |
| *G06F 1/28* | (2006.01) |

(52) U.S. Cl.
CPC ........ *G06F 1/3296* (2013.01); *G06F 11/3062* (2013.01)

(58) Field of Classification Search
CPC ... G06F 1/3296; G06F 11/3062; G06F 1/3203
See application file for complete search history.

(56) References Cited

U.S. PATENT DOCUMENTS

| | | | | |
|---|---|---|---|---|
| 2009/0193273 A1* | 7/2009 | Kobayashi | ................ | G06F 1/32 713/320 |
| 2013/0145180 A1* | 6/2013 | Branover | .............. | G06F 1/3206 713/300 |
| 2014/0223205 A1* | 8/2014 | Muthukaruppan | ... | G06F 1/3243 713/320 |
| 2019/0377395 A1* | 12/2019 | Kaburlasos | ........... | G06F 1/3206 |
| 2019/0391868 A1* | 12/2019 | Chaudhari | .......... | G06F 11/3058 |
| 2020/0089308 A1* | 3/2020 | Dai | ........................ | G06F 1/3206 |
| 2021/0026430 A1* | 1/2021 | Nakamura | ................ | G06F 1/28 |

* cited by examiner

*Primary Examiner* — Jaweed A Abbaszadeh
*Assistant Examiner* — Gayathri Sampath
(74) *Attorney, Agent, or Firm* — Womble Bond Dickinson (US) LLP

(57) ABSTRACT

Methods and systems for power management are disclosed. The disclosed methods and system for power management may reduce the likelihood of a data processing system failing to meet power budget or other types of goals regarding power consumption, use, and/or provisioning. To reduce the likelihood of the data processing system failing to meet power related goals, the data processing system may include two power managers. An integrated power manager may manage power consumption based on a current-based, fast changing representation of the quantity of power being supplied by the power supplies. In contrast, a system power manager may manage power consumption based on digital representations of the power supplied by the power supplies, which may refresh the digital representations less quickly than the rate at which the analog current based representation is refreshed.

20 Claims, 12 Drawing Sheets

SYSTEM AND METHOD FOR POWER CONSUMPTION MANAGEMENT

FIELD OF THE DISCLOSURE

Embodiments disclosed herein generally relate to power management. More particularly, embodiments disclosed herein relate to systems and methods to manage power consumption for power management.

BACKGROUND

Computing devices may store data and used stored data when performing computations. For example, computing devices may utilize data when providing computer implemented services. To provide the computer implemented services, the computing devices may consume electrical power to perform the computations. The electrical power may be obtained from a variety of sources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
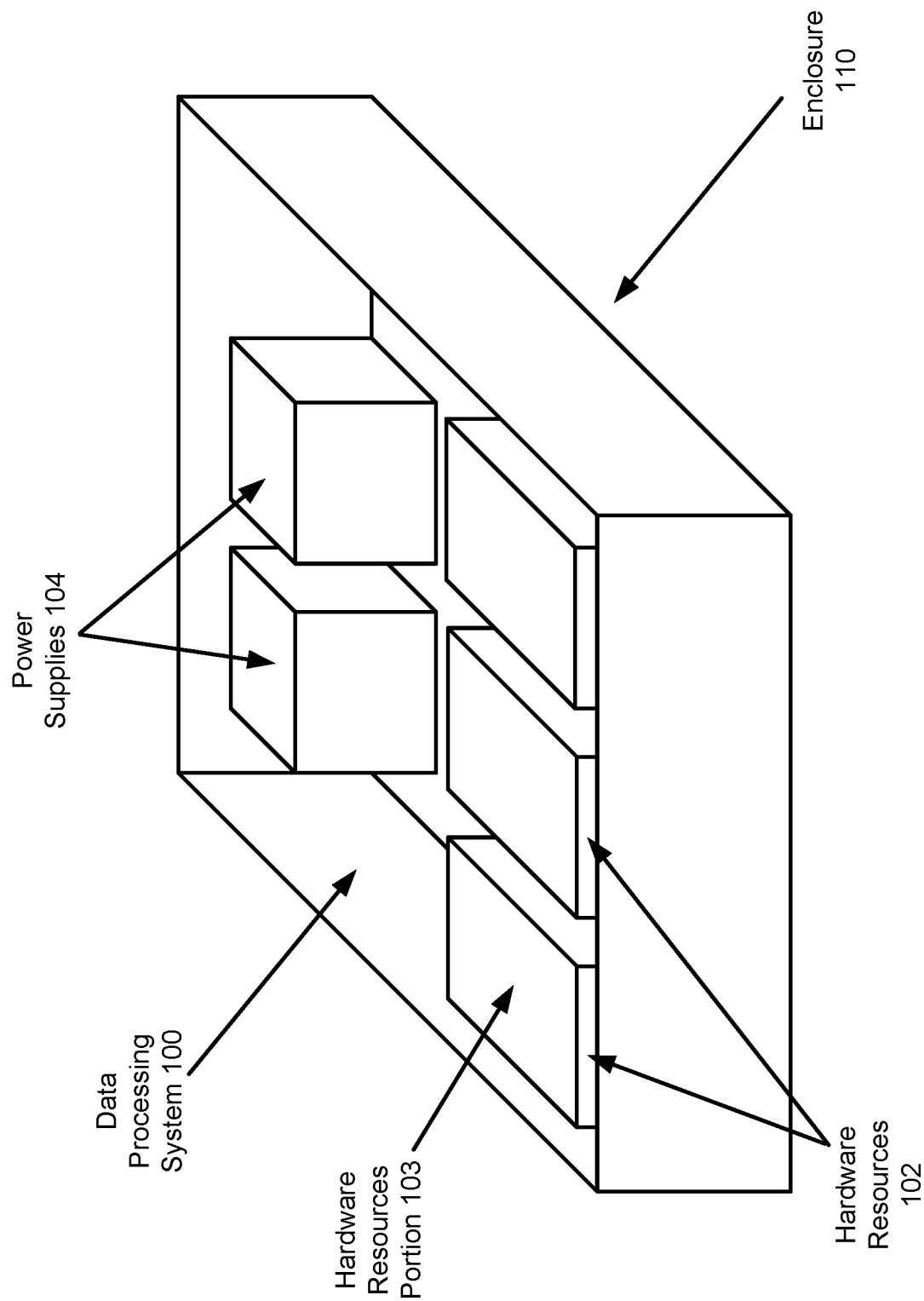
FIG. 1 shows a diagram illustrating a system in accordance with an embodiment.

Various embodiments and aspects of the disclosure will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments of the invention relate to methods and systems for power management. Specifically, the disclosed power management method and systems may reduce the likelihood of a data processing system failing to meet power budget goals and/or other types of goals regarding power consumption, use, and/or provisioning.

To reduce the likelihood of the data processing system failing to meet power related goals, the data processing system may include two power managers. The power managers may generally manage the quantity of power consumed by various devices to manage the quantity of power being supplied by one or more power supplies (e.g., a power goal) to within a predetermined limit. The integrated power manager may manage power consumption based on a current-based, fast changing representation of the quantity of power being supplied by one or more power supplies. In contrast, the system power manager may manage power consumption based on digital representations of the power supplied by the one or more power supplies, which may refresh the digital representations less quickly than the rate at which the analog current based representation is refreshed.

Consequently, the integrated power manager may have access to more up to date information regarding the quantity of power supplied by the power supplies when compared to the information available to the system power manager. However, to interpret the analog current representation of the quantity of supplied power, the integrated power manager may rely on one or more power reporting components which may scale, modify, and/or otherwise provide information regarding power supplied by the power supplied based on the analog current signal.

In an embodiment, only one of the power managers may actively manage power consumption at any point in time. For example, generally the integrated power manager may be active and relied upon to manage power consumption by various components to meet power goals. The system power manager may monitor the health of the power reporting components, which the integrated power manager depends on for successful power management, and automatically take over power management responsibility when it is determined that the health of the power reporting components is impacting the integrated power manager.

Once the system power manager takes over power management, it may continue to manage power consumption until it is determined that the health of the power reporting components has likely improved sufficiently for the integrated power manager to again manage power consumption in a manner consistent with the power goals for the data processing system. Once power management is relinquished back to the integrated power manager, then the system power manager may return to monitoring the power reporting components for signs of poor health.

In an embodiment, a data processing system to provide computer implemented services is provided. The data processing system may include a power supply adapted to provide power; power consumption reporting hardware; hardware resources that consume power supplied by the power supply; an integrated power manager adapted to: manage a quantity of the power supplied by the power supply based on a first system power consumption level reported by the power consumption reporting hardware; and a system power manager adapted to: make a determination, based on the first system power consumption level and/or a second system power consumption level reported by the power supply, that a defect in the management of the quantity of the power supplied by the power supply by the integrated power manager is present; in response to the determination: disable management of the quantity of the power supplied by the power supply by the integrated power management; and manage the quantity of the power supplied by the power supply based on the second system power consumption level.

Making the determination may include making a second determination that the first system power consumption level exceeds a threshold, the threshold being based on a maximum quantity of consumable power in a power budget for the data processing system; in response to the second determination: starting a timer to run for a predetermined duration of time; while the timer is running, monitor the second system power consumption level; and making the determination based on the monitored second system power consumption level exceeding the threshold during all of the duration of time.

Making the determination may further include making a second determination that the first system power consumption level exceeds the second system power consumption level; in response to the second determination: identifying whether the second system power consumption level exceeds a second threshold, the second threshold being based on a percentage of a maximum quantity of consumable power in a power budget for the data processing system; when the second system power consumption level exceeds the second threshold: identifying whether the first system power consumption level exceeds the second system power consumption level by a third threshold, the third threshold being based on a value of the second system power consumption level and a buffer value that causes the third threshold to be greater than the second system power consumption level; and making the determination based on the first system power consumption level exceeding the second system power consumption level by the third threshold.

The integrated power manager and the system power manager may be adapted to manage the power supplied by the power supply to within a limit defined by a node lower boundary value.

The node lower boundary value may be based on a maximum amount of power the data processing system may consume while fully utilized and fully throttled.

The system power manager may also be adapted to: after disabling management of the quantity of the power supplied by the power supply by the integrated power management:
monitor operation of the data processing system; make a second determination, based on the operation of the data processing system, that a power management transition should be performed; in response to the second determination: initiate management of the quantity of the power supplied by the power supply by the integrated power management; and disable management the quantity of the power supplied by the power supply based on the second system power consumption level by the system power manager.

The second determination may be made by comparing events that occur during the monitored operation of the data processing system to a list of events that each indicate that a defect in operation of the power consumption reporting hardware may be remediated.

The list of events may include an alternating current cycling of the data processing system, a direct current cycling of the data processing system, an initialization of the system power manager, a firmware update of the system power manager, and a power cycling of the power system manager.

The power consumption reporting hardware may generate the first system power consumption level using an electrical current output from the power supply that varies in magnitude proportionally to a current power output of the power supply, and the power consumption reporting hardware comprises an analog to digital converter to provide the integrated power manager with a digital representation of the current power output of the power supply.

The system power manager may obtain the second system power consumption level using a digital representation of the current power output of the power supply provided by the power supply, wherein the digital representation of the current power output of the power supply is updated less frequently than the electrical current output from the power supply.

The system power manager may include an independently operating computing device hosted by the data processing system, and the integrated power manager comprises a function performed by a processor of the data processing system. The processor may be a portion of the hardware resources.

In an embodiment, a method of managing power consumption by a data processing system is provided. The method may include obtaining a first system power consumption level from an integrated power manager of the data processing system; obtaining a second system power consumption level from a power supply of the data processing system, the first system power consumption level and the second system power consumption level being substantially identical when the integrated power manager is operating in a predetermined manner; making a determination, based on the first system power consumption level and/or the second system power consumption level, that a defect in the management of a quantity of power supplied by the power supply by the integrated power manager is present; in response to the determination: disabling management of the quantity of the power supplied by the power supply by the integrated power management; and managing the quantity of the power supplied by the power supply based on the second system power consumption level with a system power manager.

Making the determination may include making a second determination that the first system power consumption level exceeds a threshold, the threshold being based on a maximum quantity of consumable power in a power budget for the data processing system; in response to the second determination: starting a timer to run for a predetermined duration of time; while the timer is running, monitoring the second system power consumption level; and making the determination based on the monitored second system power consumption level exceeding the threshold during all of the duration of time.

Making the determination may further include making a second determination that the first system power consumption level exceeds the second system power consumption level; in response to the second determination: identifying whether the second system power consumption level exceeds a second threshold, the second threshold being based on a percentage of a maximum quantity of consumable power in a power budget for the data processing system; when the second system power consumption level exceeds the second threshold: identifying whether the first system power consumption level exceeds the second system power consumption level by a third threshold, the third threshold being based on a value of the second system power consumption level and a buffer value that causes the third threshold to be greater than the second system power consumption level; and making the determination based on the first system power consumption level exceeding the second system power consumption level by the third threshold.

The system power manager may include an independently operating computing device hosted by the data processing system, and the integrated power manager may include a function performed by a processor of the data processing system.

In an embodiment, a non-transitory computer readable medium storing instructions that, when executed by a processor, cause a method for managing power consumption by a data processing system to be performed is provided. The method may be similar to that discussed above.

Turning to FIG. 1, a diagram illustrating a system in accordance with an embodiment is shown. The system shown in FIG. 1 may be used to provide computer implemented services. The system may include, but is not limited to, data processing system 100 and enclosure 110. Each of these components is discussed below.

Data processing system 100 may provide the computer implemented services. When doing so, data processing system 100 may consume electrical power from other sources. To provide the computer implemented services, data processing system 100 may include hardware resources 102 and power supplies 104.

Hardware resources 102 may include any number of physical devices (e.g., processors, memory modules, storage devices, communications devices, etc.) that provide computing resources (e.g., processor cycles, transitory storage, persistent storage, communications bandwidth, etc.) usable to provide the computer implemented services. The computing resources may be used to support applications (e.g., computing instructions executing with the computing resources) hosted by data processing system 100. The applications may provide the computer implemented services. The computer implemented services may include any type and quantity of computer implemented services such as, for example, database services, data storage services, electronic communications services, etc.

When operating, hardware resources 102 may consume electrical power to provide the computing resources used to provide the computer implemented services. The hardware resources may utilize power from power supplies 104. Power supplies may include any number of physical devices (e.g., transformers, current/voltage sensors, controllers, etc.) usable to obtain power from power sources (not shown) and provide conditioned power to hardware resources 102 and/or other components. The power obtained from the power sources may be any form of power (e.g., alternating current, direct current) but the conditioned power may have specific characteristics (e.g., direct current of a predetermined voltage level) based on the hardware resources 102. For example, hardware resources 102 may not operate as expected when hardware resources 102 are provided with power that is not conditioned power.

The capacity for providing conditioned power to hardware resources 102 may be limited by power supplies 104, sources of power external to the data processing, and/or other factors. However, hardware resources 102 may be capable of drawing a quantity of power from power supplies 104 that exceeds a predetermined limit (e.g., a power budget).

To reduce the likelihood of the hardware resources 102 drawing a quantity of power that exceeds the predetermined limit, the hardware resources may provide integrated power management functionality. The integrated power management functionality may allow for other entities (e.g., a system power manager, discussed below) to specify limits on the quantity of power to be drawn from one or more of power supplies 104. However, as will be discussed in greater detail below, the integrated power management functionality of hardware resources 102 may be dependent on the operation of other components such as power consumption reporting hardware, discussed below. If the power consumption reporting hardware fails to operate properly, then the integrated power management functionality may fail to properly manage power consumption from power supplies 104.

In general, embodiments disclosed herein may provide systems, devices, and/or methods for managing power consumption of a data processing system. To manage the power consumption, the data processing system may preferentially utilize integrated power management functionality of various hardware resources. However, the data processing system may perform one or more actions to verify or otherwise check whether the integrated power management functionality is likely to be performed in accordance with expectations. If it is unlikely that the integrated power management functionality will be performed in accordance with expectations, then the data processing system may automatically switch over to other means for managing power consumption until it is verified that the integrated power management functionality will likely be performed in accordance with expectations. By doing so, embodiments disclosed herein may provide a data processing system that is more likely to consume a quantity of power that is commensurate with a corresponding power budget for the data processing system. Accordingly, undesirable conditions (e.g., failure, impairment, etc.) on the data processing system and/or components operably connected to the data processing system (e.g., sources of power used to power a data processing system, other data processing systems) may be avoided.

Enclosure 110 may include a physical structure for housing data processing system 100. The physical structure may be a form factor compliant structure such as, for example, a rack mount enclosure for a server. The physical structure may be other types of structures for housing data processing systems without departing from embodiments disclosed herein.

Enclosure 110 may include any number of sub-enclosures such as, for example, server chassis sleds, internal blocks, and/or other structures in which various portions of hardware resources 102 are positioned. In an embodiment, a hardware resources portion 103 positioned in a sub-enclosure operates as an independent computing device. Enclosure 110 may include any number of sub-enclosures that each include computing devices that operate independently and/or cooperatively to provide the computer implemented services.

While the system of FIG. 1 has been illustrated as including a limited number of specific components, a system may include different numbers, types, and/or quantities of components without departing from the embodiments disclosed herein.

Turning to FIG. 2, a block diagram of the system shown in FIG. 1 in accordance with an embodiment is shown. As discussed above, embodiments disclosed herein may improve the likelihood of a data processing system meeting power consumption goals (e.g., based on power budgets or other types of power goals) while providing desired computer implemented services (e.g., to a user of data processing system 100, to other data processing systems, to other types of devices, etc.).

To provide the computer implemented services, data processing system 100 may include hardware resources 102 and power supplies 104. The power supplies 104 may be capable of supplying power to hardware resources 102 so that the hardware resources 102 may provide the computer implemented services through their operation.

To manage the power consumed by hardware resources 102 and/or provided by power supplies 104, data processing system 100 may include integrated power manager 202, power consumption reporting hardware 204, system power manager 206, and buses 208. Each of these components is discussed below.

Integrated power manager 202 may provide power management services. The power management services may include (i) obtaining reports of power supplied by power supplies 104 via power consumption reporting hardware 204 and (ii) obtaining information regarding power consumption limits (e.g., such as power budgets), and (iii) enforcing the power budgets on the hardware resources 102 to reduce the likelihood of the power consumption reports obtained from power consumption reporting hardware 204 indicating that the power supplies 104 are providing a larger amount of power than that authorized in the information regarding power consumption limits. However, because integrated power manager 202 may rely on power reports from power consumption reporting hardware 204, integrated power manager 202 may be limited in its ability to manage power consumption to the extent of the accuracy of the power reports. For example, in accurate power reports may prevent or limit integrated power manager 202 from appropriately modifying the operation of various hardware sources 102 to meet the requirements of the power consumption limits.

In an embodiment, integrated power manager 202 is implemented as a portion of one or more of hardware sources 102. For example, integrated power manager 202 may be implemented as a function performed by a processor. The processor may be operably connected to power consumption reporting hardware 204 to allow the integrated power manager 202 to attempt to monitor the power supplied by power supplies 104.

Power consumption reporting hardware 204 may provide power supply reporting services. Power supply reporting services may include (i) attempting to identify a quantity of power being supplied by one or more of power supplies 104 and (ii) reporting the identified quantity to integrated power manager 202 and/or system power manager 206.

In an embodiment, power consumption reporting hardware 204 attempts to identify the quantity of power being supplied using a current output from power supplies 104. The current output may dynamically change to reflect changes in the quantity of power being supplied by one or more of power supplies 104. Power consumption reporting hardware 204 may include, for example, analog to digital converters, voltage level scaling circuitry, and/or other circuits such that power consumption reporting hardware 204 may provide integrated power manager 202 with a digital representation of the quantity of power supplies 104 is currently providing. However, power consumption reporting hardware 204 may be susceptible to errors in operation (or other types of deviations) that may make its power reports inaccurate. For example, any of the components of power consumption reporting hardware 204 may fail without notifying the power managers of the failures. In another example, firmware of one or more components of the power consumption reporting hardware 204 may fail to operate and/or may operate inaccurately thereby causing spurious or otherwise inaccurate power reports to be provided to integrated power managers.

Further, power consumption reporting hardware 204 may only provide accurate power consumption reports for certain ranges of power. For example, power consumption reporting hardware 204 may not accurately report the current power being supplied by one or more of power supplies 104 while the quantity of power supplies falls below 50% of the maximum quantity of power that one or more of power supplies 104 is rated to provide.

System power manager 206 may provide power management services. The power management services may include (i) monitoring operation of power supplies 104, power consumption reporting hardware 204, and integrated power manager 202, and (ii) when the operation indicates that integrated power manager 202 is defectively managing the power supplied by power supplies 104 such that it exceeds power supply goals (e.g., based on a power budget), taking over management of the hardware resources 102 to meet the power supply goals.

Figure 5:
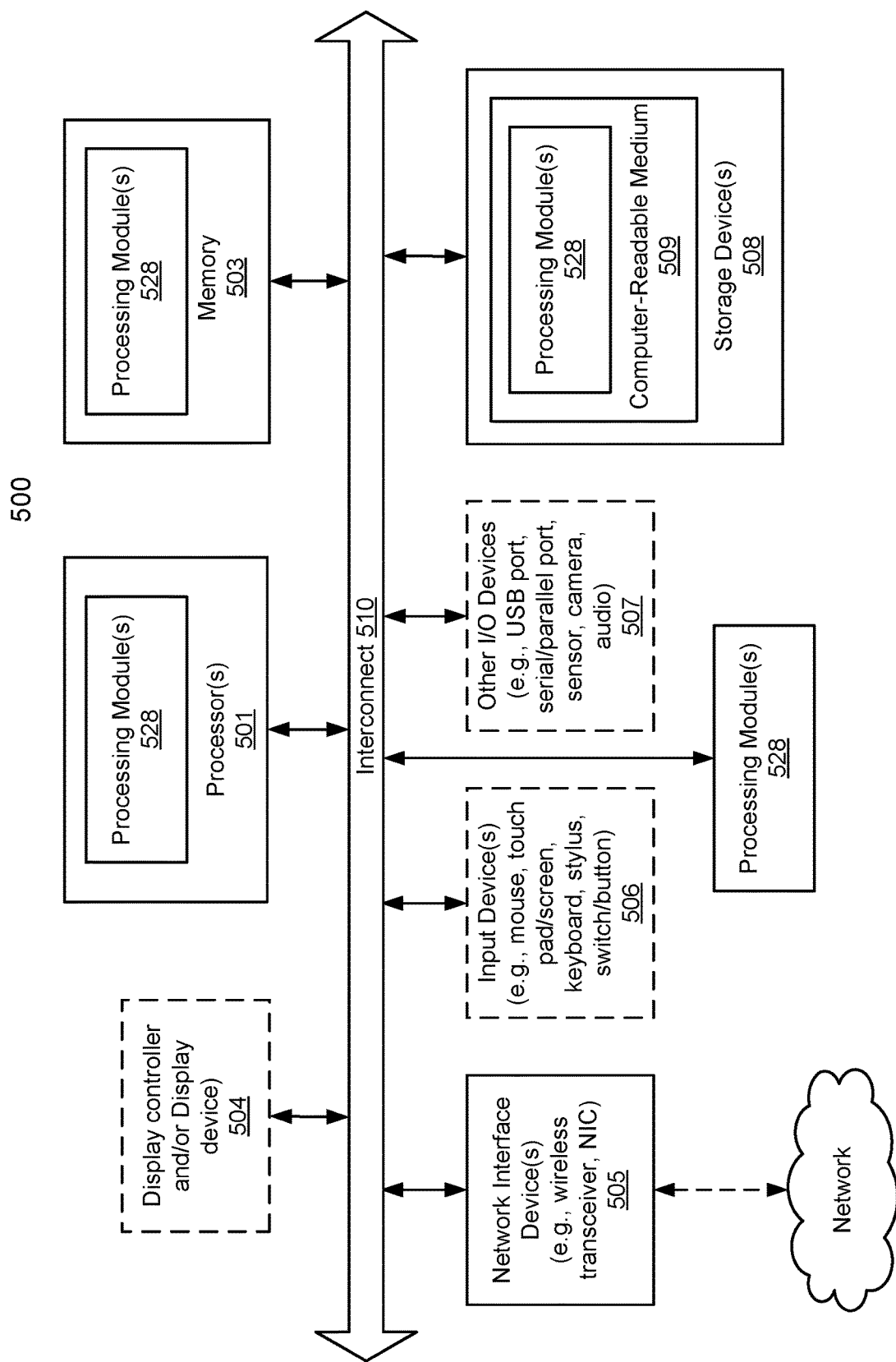
FIG. 5 is a block diagram illustrating a data processing system in accordance with an embodiment.

In an embodiment, system power manager 206 is implemented with an independently operating computing device hosted by data processing system 100 (data processing system 100 may also be implemented with a computing device). Refer to FIG. 5 for additional details regarding computing devices. In an embodiment, the computing devices with which system power manager 206 is implemented operates as an out of band management controller for data processing system 100.

Figure 2A:
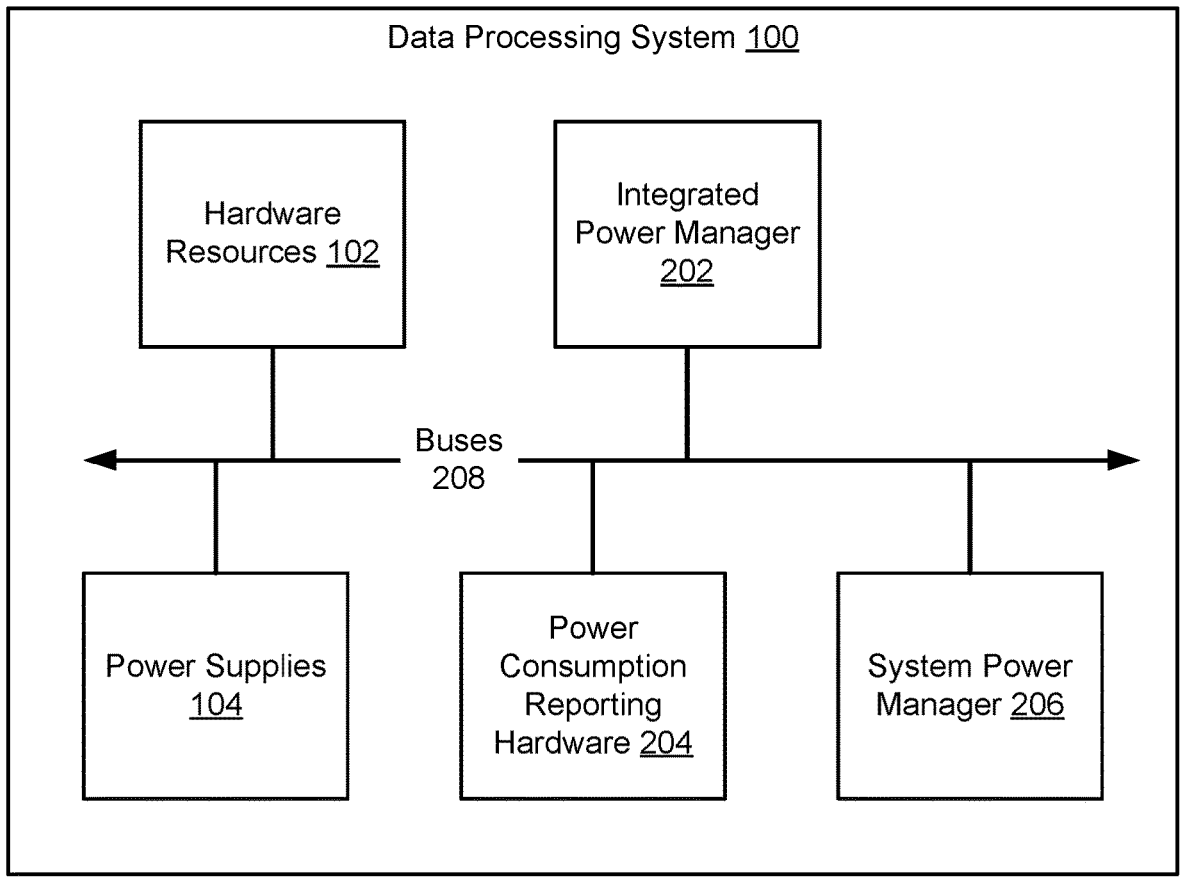
FIG. 2A shows a block diagram illustrating a data processing system in accordance with an embodiment.
Figure 2B:
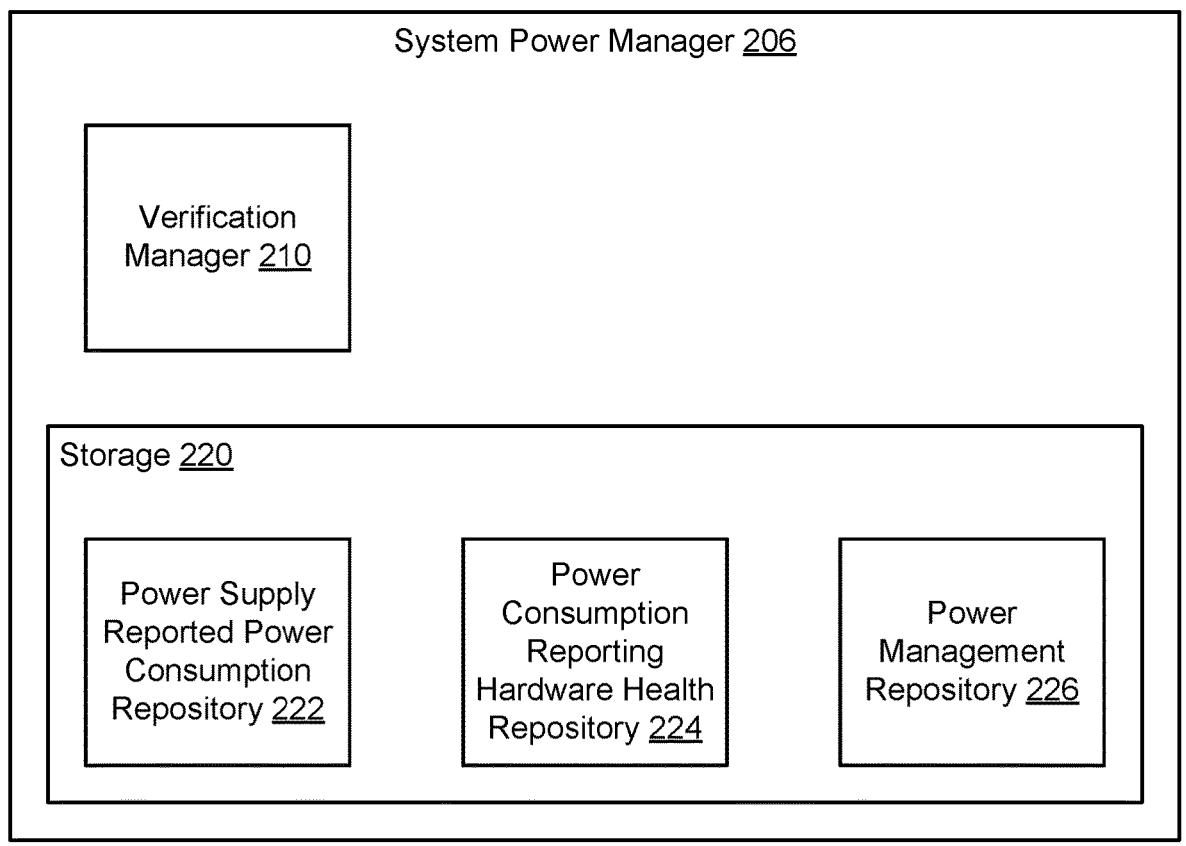
FIG. 2B shows a block diagram illustrating a system power manager in accordance with an embodiment.

Refer to FIG. 2B for additional details regarding system power manager 206.

In an embodiment, power supplies 104 provide power to hardware resources 102 and provide at least two reporting mechanisms with respect to the quantity of power currently being provided. A first reporting mechanism may be implemented by output an electrical current that is scaled dynamically based on the quantity of power being outputted by one or more of power supplies 104. The electrical current may be dynamically scaled rapidly such that little difference between the power being supplied and current being outputted by one or more of power supplies 104 exists. For example, the current output may be implemented with a winding on a transformer used by one or more of the power supplies. The winding may allow for sensing of the quantity of power traversing through the transformer. Consequently, the current may automatically scale proportionally to the output power. The current output may be implemented with different structures without departing from embodiments disclosed herein.

A second reporting mechanism may be implemented by outputting a digital representation of the output power. For example, one or more of power supplies 104 may include circuitry configured to measure power output of the respective power supply and output a digital representation of the power output. However, the digital representation may be updated less frequently then the output current of the first reporting mechanism. Consequently, the digital representation may cause lag and/or other undesirable issues which may limit the ability of power managers to appropriately manage power consumption of hardware resources 102 to limit the quantity of power supplied by power supplies 104 to meet power goals.

To manage the quantity of power supplied by power supplies 104, the integrated power manager 202 and/or system power manager 206 may (i) obtain copies of power budgets, (ii) identifying a portion of power consumption mechanisms of hardware resources 102 usable to cause hardware resources 102 to consume power as specified by the power budgets, and/or (iii) invoke the identified portion of the power consumption mechanisms to attempt to place hardware resources 102 in compliance with the power budgets. In this manner, the quantity of power supplied by power supplies 104 may be managed to meet power consumption goals.

The power consumption mechanisms may include, for example, modulation of clock speed or processors, memory modules, storage devices, communications devices, and/or other types of devices (collectively, "hardware devices"); suspending and/or resuming operation of various portions of the hardware devices; and/or other functions that may be usable at any level of granularity to reduce the performance (e.g., rates of contribution of computing resources) of hardware resources 102 for power draw management purposes.

Buses 208 may include one or more physical devices for operably connecting components of data processing system 100. Buses 208 may include, for example, a power bus over which power supplies 104 provide conditioned power to hardware resources 102 and/or other components. Buses 208 may include any number of data buses (analog and/or digital) over which data sent between the components of data processing system 100. For example, the current output from power supplies 104 may be transmitted to power consumption reporting hardware 204 via an analog bus while the digital representation generated by power consumption reporting hardware 204 may be provided to integrated power manager 202 and/or system power manager 206 via one or more digital buses. The data buses may facilitate, for example, direct communications, side band communications (e.g., between integrated power manager 202/system power manager 206 and corresponding portions of hardware resources 102), interrupt communications (e.g., between power supplies 104 and hardware resources 102), and/or other types of communications.

In an embodiment, integrated power manager 202 and/or system power manager 206 is implemented with a computing device such as a host or server, a personal computer (e.g., desktops, laptops, and tablets), a "thin" client, a personal digital assistant (PDA), a Web enabled appliance, a controller, a system on a chip, an embedded computing device, an out of band management controller, a mobile phone (e.g., Smartphone), and/or any other type of data processing device or system. For additional details regarding computing devices, refer to FIG. 5.

Power supplies 104, as discussed above, may provide power services. The power services may include (i) drawing power from external sources, (ii) processing the power to obtain conditioned power, (iii) providing the conditioned power to other devices such as hardware resources 102, and (iv) providing digital and/or analog representations of the output power being supplied by power supplies 104.

To provide its functionality, power supplies 104 may include any number and type of components (e.g., transformers, rectifiers, etc.) to process power from various sources, one or more sensors to measure input current, input voltage, output current, output voltage, input power, output power, etc., and/or a computing device such as a host or server, a personal computer (e.g., desktops, laptops, and tablets), a "thin" client, a personal digital assistant (PDA), a Web enabled appliance, a controller, a system on a chip, an embedded computing device, an out of band management controller, a mobile phone (e.g., Smartphone), and/or any other type of data processing device or system. For additional details regarding computing devices, refer to FIG. 5.

In an embodiment, power supplies 104 do not include functionality to limit output power. For example, power supplies 104 may be adapted to output conditioned power up to a predetermined level after which the operation of the power supplies 104 may deteriorate or otherwise diverge from nominal operation.

Figure 3A:
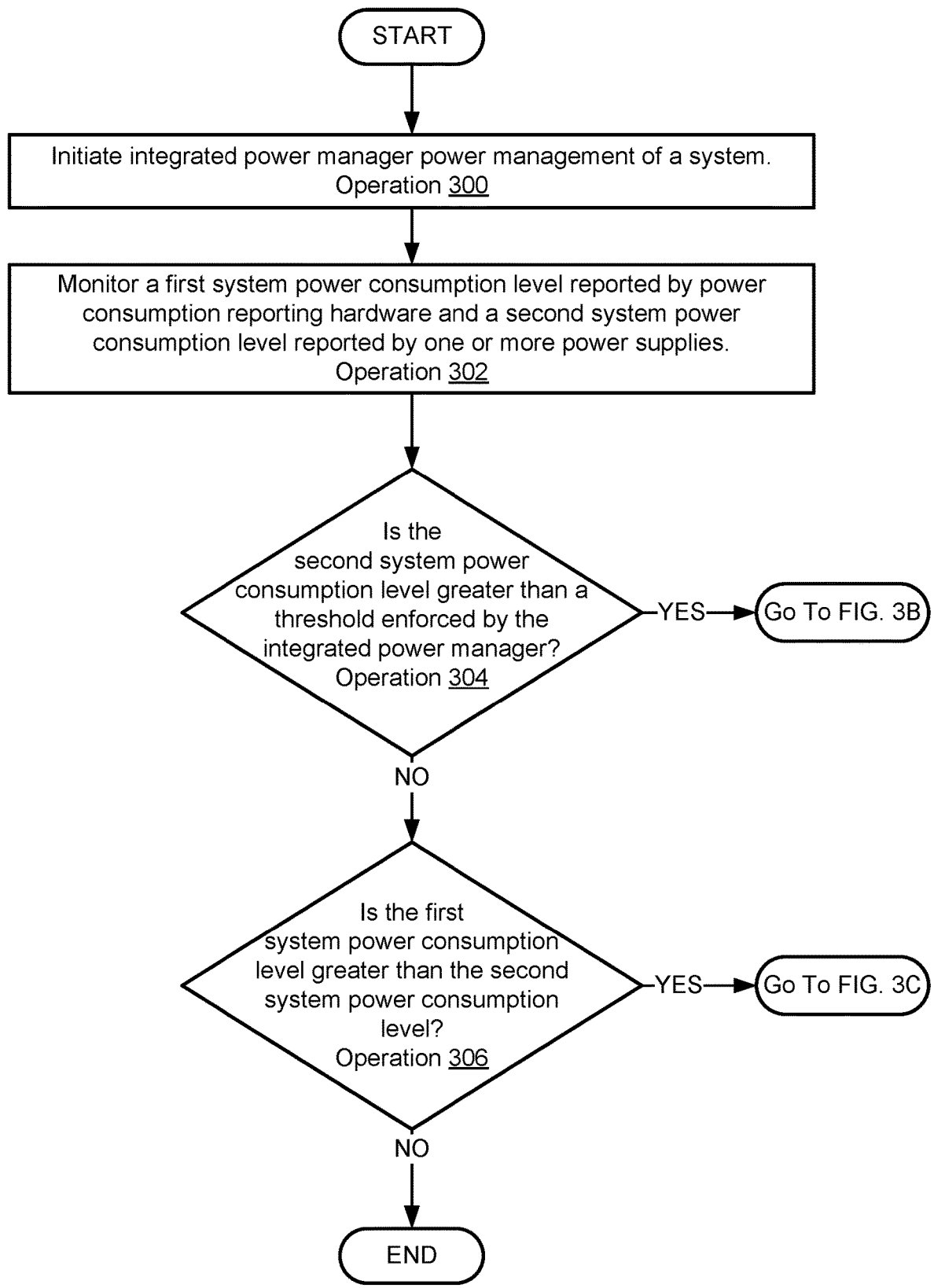
FIG. 3A shows a flow diagram illustrating a method of performing power management in accordance with an embodiment.

When providing their functionalities, integrated power manager 202 and system power manager 206 may perform all, or a portion, of the methods illustrated in FIGS. 3A-3A.

Hardware resources 102, as discussed above, may include any number and types of hardware devices that may facilitate computer implemented services. Hardware resources 102 may include functionality to (i) modify their power consumption mechanisms to dynamically change the quantity of power being drawn from buses 208 (e.g., which may result in reduced performance of the hardware resources 102 and/or the computer implemented services), and/or (ii) throttle their performance to substantially reduce power being drawn from buses 208 (e.g., which may suspend and/or reduce performance of the hardware resources 102 and/or the computer implemented services to a greater extent than with modification of the power consumption mechanisms). In an embodiment, integrated power manager 202 is implemented as a portion of one or more of hardware resources 102. For example, integrated power manager 202 may be implemented as a functionality of a hardware processor, or another hardware device.

While the system of FIG. 2A has been illustrated as including a limited number of specific components, a system may include different numbers, types, and/or quantities of components without departing from the embodiments disclosed herein.

Turning to FIG. 2B, a diagram of system power manager 206 in accordance with an embodiment is shown. As discussed above, system power manager 206 may provide power management services. To provide its functionality, system power manager 206 may include verification manager 210 and storage 220. Each of these components is discussed below.

Verification manager 210 may provide the power management services. To do so, verification manager 210 may: (i) obtain first system power consumption reports from one or more of power supplies 104 (which may be stored in power supply reported power consumption repository 222), (ii) obtain second system power consumption reports from power consumption reporting hardware, (iii) using the reports and information in power management repository 226, determine whether operation of an integrated power manager is impaired, (iv) disable power management by the integrated power manager while it is impaired and take over power management, and (v) return power management to the integrated power manager while it is unlikely to be impaired.

In an embodiment, verification manager 210 is implemented using a hardware device including circuitry. The hardware device may be, for example, a digital signal processor, a field programmable gate array, or an application specific integrated circuit. The circuitry may be adapted to cause the hardware device to perform the functionality of verification manager 210. Verification manager 210 may be implemented using other types of hardware devices without departing embodiment disclosed herein.

In one embodiment, verification manager 210 is implemented using a processor adapted to execute computing code stored on a persistent storage that when executed by the processor performs the functionality of verification manager 210 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 220 may store data structures including power supply reported power consumption repository 222, power consumption reporting hardware health repository 224, and power management repository 226. Each of these data structures is discussed below.

Power supply reported power consumption repository 222 may be implemented with one or more data structures that include any type and quantity of information indicating quantities of power supplied by one or more power supplies. The information included in this repository may be based on reports from the one or more power supplies.

Power consumption reporting hardware health repository 224 may be implemented with one or more data structures that include any type and quantity of information usable to diagnose whether power consumption reporting hardware is likely or unlikely to be properly reporting the current power being supplied by one or more power supplies. For example, power consumption reporting hardware health repository 224 may include any type and quantity of information indicating quantities of power supplied by one or more power supplies as reported by the power consumption reporting hardware.

Power management repository 226 may be implemented with one or more data structures that include any quantity and type of information usable to ascertain whether an integrated power manager is impaired in its management of power supplied by one or more power supplies. The power management repository 226 may include, for example, thresholds, rules, and/or other metrics that may be used to ascertain whether the integrated power manager is operationally impaired. For example, the power management repository 226 may include a threshold indicating a maximum quantity of power that may output by one or more power supplies (e.g., a node lower boundary), a threshold indicating a range of power output levels by one or more power supplies over which the power consumption reporting hardware should accurately report output power of the power supplies (e.g., and/or ranges over which the power consumption reporting hardware will not provide accurate power reports), etc.

The power management repository 226 may also include, for example, lists of events, conditions, and/or other characteristics indicating that and integrated power manager may be likely to no longer be impaired (e.g., after being impaired). For example, the list of events may include power cycling of the data processing system (e.g., AC and/or DC power), various types of restarts and/or initializations of various components, various types of changes to firmware, etc. Any of the listed events may be associated with a likelihood of power consumption reporting hardware being likely to properly operate after an occurrence of one or more of these events. Consequently, when such a listed event is encountered, the system power manager may automatically return power management responsibility to an integrated power manager.

In an embodiment, power management repository 226 specifies a threshold ascertain over consumption of power. The threshold may be a maximum amount of power that may be supplied using one or more power supplies. The threshold may be used to ascertain, in part, whether management of power consumption by one or more hardware devices should be switched from an integrated power manager to a system power manager. The threshold may be compared to a quantity of power supplied and reported as being supplied by one or more power supplies. In an embodiment, the threshold is a lower node boundary (e.g., a maximum quantity of power which hardware components are expected to consume, and such value may be used, in part, to a size/select one or more of the power supplies). As will be discussed in greater detail below, if it is determined that the quantity of power being supplied by the one or more power supplies exceeds the threshold, then a number of actions may be performed to decide whether to proceed with switching from integrated power manager to system power manager management of power consumption by hardware devices.

In an embodiment, power management repository 226 specifies one or more thresholds usable to ascertain whether hardware consumption of power is being restricted by an integrated power manager in an undesired or unexpected manner. The one or more thresholds may include a load threshold for the one or more power supplies. The load threshold may be, for example, 25%, 50%, 75%, or another percentage of the total power output for which the one or more power supplies are rated to output power. The load threshold may be used, for example, to determine whether the power consumption reporting hardware should be accurately reporting power supplied by one or more power supplies. For example, if the one or more power supplies are providing less than 50% of the rated power output, then it may be assumed that the power consumption reporting hardware may not be accurately reporting power supplied by the one or more power supplies.

The one or more thresholds may also include a reporting accuracy threshold for the power consumption reporting hardware. The reporting accuracy threshold may be, for example, 10% of the actual power output by the one or more power supplies. Thus, if the system power consumption reported by the power consumption reporting hardware differs from the actual amount of power output (e.g., as reported by the power supply), then it may be determined that the power consumption reporting hardware is improperly reporting the supplied power.

The one or more thresholds may be used in combination, for example, to ascertain whether an integrated power manager is likely to be improperly managing power consumption by hardware resources. For example, the load threshold may be used to ascertain whether an accuracy check is worth performing, and the accuracy threshold may be used to determine whether the power consumption reporting hardware is accurately reporting power supplied by the one or more power supplies.

While various data structures have been illustrated and described in FIG. 2B with specific structures, any of the data structures may be implemented with different structures (e.g., lists, tables, linked lists, databases, etc.), stored in different locations, and/or spanned across any number of devices without departing from embodiments disclosed herein.

As discussed above, the components of FIG. 1 may perform various methods to manage power consumption and/or supply in a data processing system. FIGS. 3A-3D illustrate examples of methods that may be performed by the components of FIG. 1. In the diagrams discussed below and shown in FIGS. 3A-3D, any of the operations may be repeated, performed in different orders, and/or performed in parallel with or a partially overlapping in time manner with other operations.

Turning to FIG. 3A, a flow diagram illustrating a method of managing power in a data processing system in accordance with an embodiment is shown.

At operation 300, integrated power manager management of power in a system is initiated. In other words, the integrated power management may be tasked with ensuring that power used in a data processing system meets one or more predetermined criteria (e.g., a power budget). Management of the power by the integrated power manager may be initiated by, for example, providing the integrated power manager with the power budget, notifying the integrated power manager that it is to manage power in the system, and/or by performing other actions. The integrated power manager may, as discussed above, manage the power in the system by obtain system power consumption information from power consumption reporting hardware and use the obtained system power consumption information to dynamically modify power consumption by one or more hardware resources. The dynamic modification may increase the likelihood that power supplied by one or more power supplies meets criteria specified in the power budget.

For example, the one or more power supplies may not be capable of limiting the quantity of power they supply. Consequently, power consuming devices may cause the one or more power supplies to provide more power than is specified in the power budget if the power consumption by the hardware resources is not managed.

At operation 302, a first system power consumption level reported by power consumption reporting hardware may be monitored. A second system power consumption level reported by one or more power supplies may also be monitored.

The first system power consumption level may be monitored by reading it from the power consumption reporting hardware, by obtaining it from an integrated power manager (e.g., that previously obtained it in a reporting), or via other means.

The second system power consumption level may be monitored by reading it from the one or more power supplies. In an embodiment, the second system power consumption level is not as up to date as the first system power consumption level. For example, the second system power consumption level may lag in time or otherwise may not be as timely obtained with respect to when the one or more power supplies actually supplied the power upon which the second system power consumption level is based. In contrast, the first system power consumption level may be updated more frequently thereby allowing it to be potentially more accurately reflect the actual power being supplied by the one or more power supplies.

At operation 304, it is determined whether the second system power consumption level is greater than a threshold enforced by the integrated power manager. The threshold may be the maximum quantity of power which the one or more power supplies to be allowed to provide, which the integrated power manager may be tasked with enforcing. However, because the integrated power manager may rely on the first system power consumption level, the integrated power manager may fail in its task.

The determination may be made by comparing the second system power consumption level to the threshold. If it is determined that the second system power consumption level exceeds the threshold, then the method may proceed to the operations in FIG. 3B (e.g., continuing to the box labeled START). Otherwise the method may proceed to operation 306. Proceeding to operation 306 may indicate that the system power manager believes that the integrated power manager is, to an extent, operating properly and/or the power consumption reporting hardware may be operating properly.

At operation 306, it is determined whether the first system power consumption level is greater than the second system power consumption level. Generally, a deviation of the first system power consumption level from the second system power consumption level may indicate that power consumption reporting hardware may not be healthy (e.g., may be operating improperly). However, any deviation may not necessarily indicate poor health of the power consumption reporting hardware. Further, if the first system power consumption level reported by the power consumption reporting hardware is greater than the actual power being supplied, then the integrated power manager may take unnecessary action to throttle power consumption by hardware resources if the first system power consumption level is larger (e.g., to ensure that the power budget is appropriately enforced). Consequently, poor health of the power consumption reporting hardware may result in poor operation of the hardware resources without receiving any benefit.

Figure 3B:
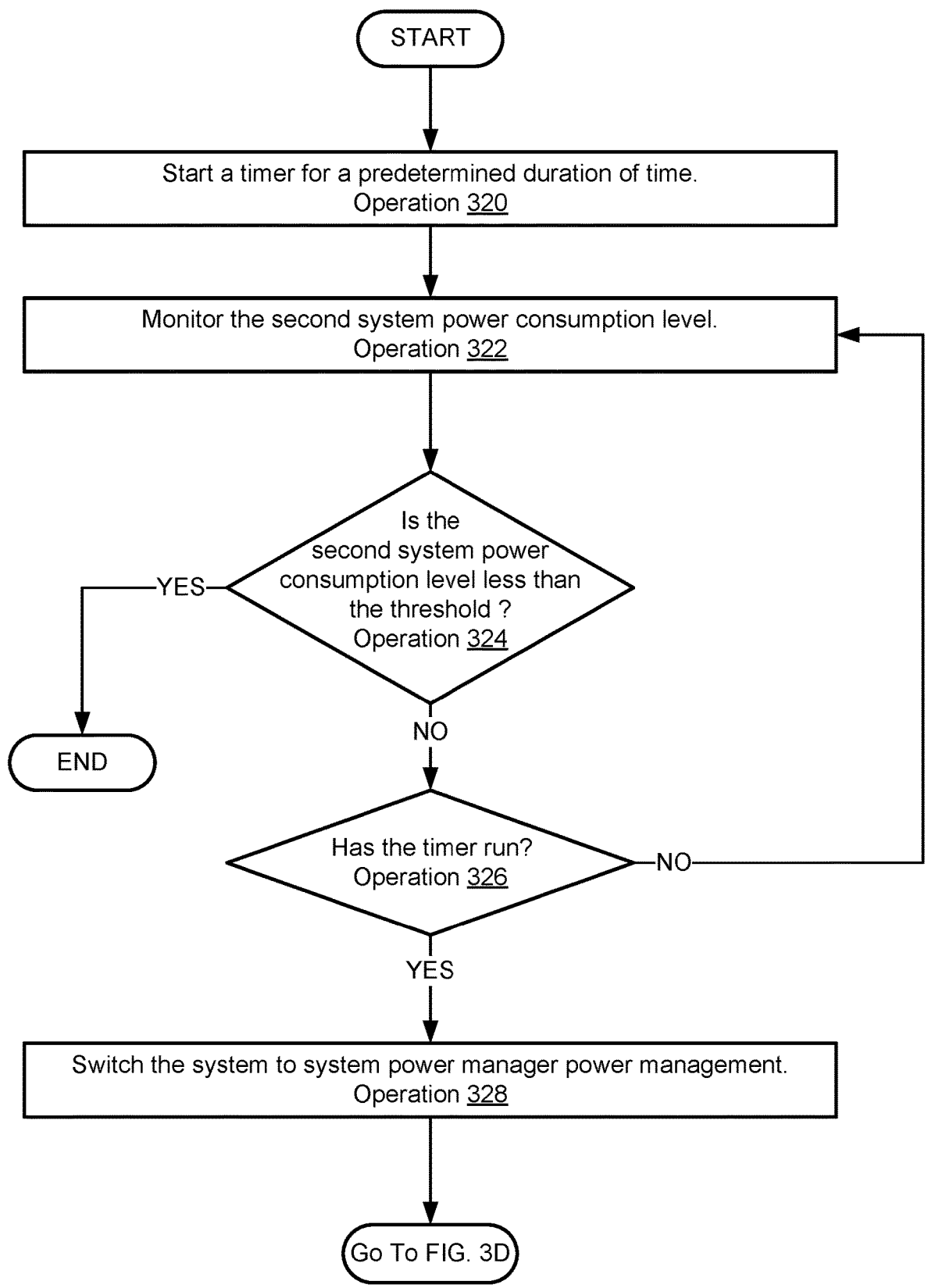
FIG. 3B shows a continuation of the flow diagram illustrated in FIG. 3A in accordance with an embodiment.
Figure 3C:
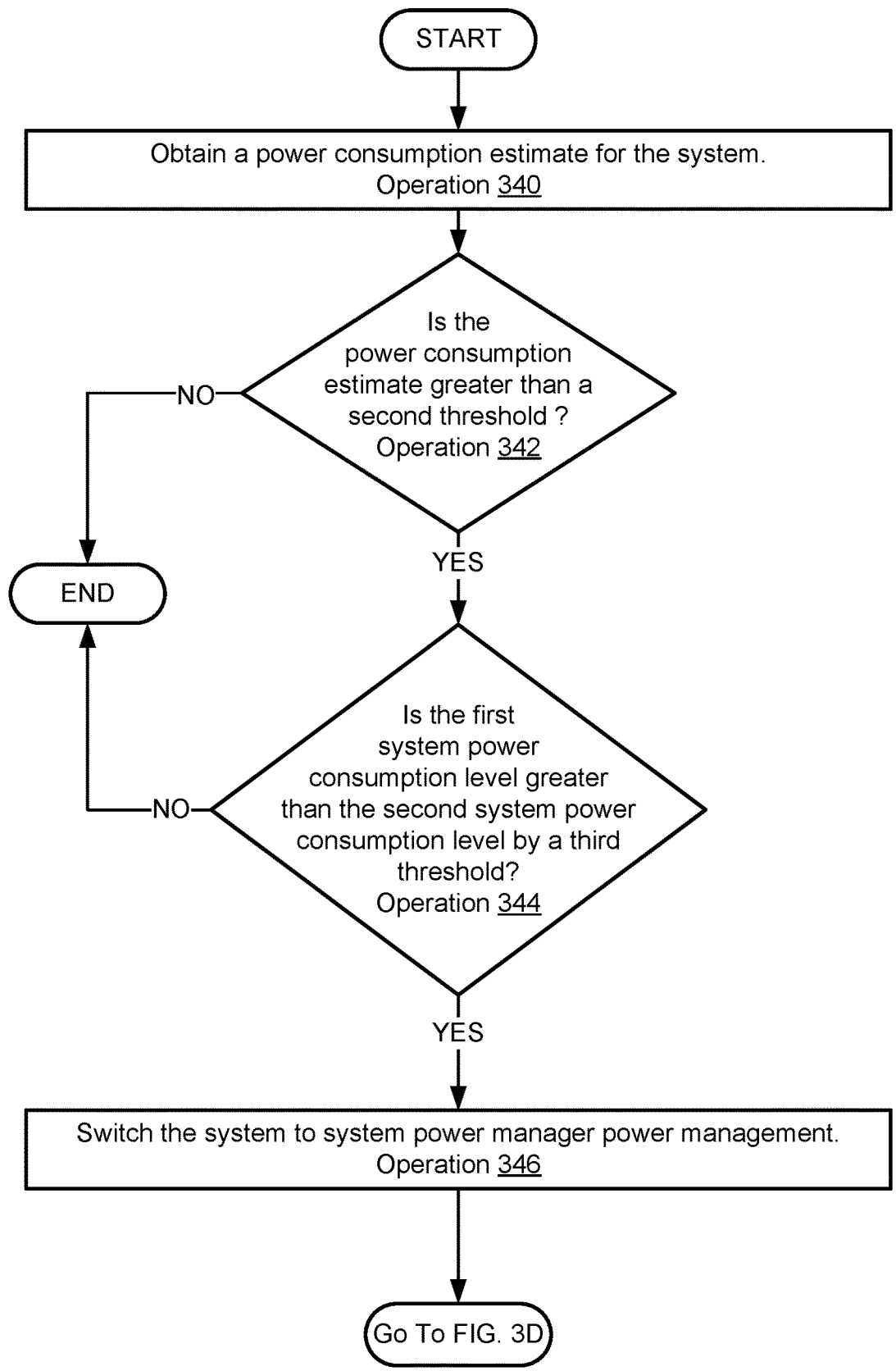
FIG. 3C shows a continuation of the flow diagram illustrated in FIG. 3A in accordance with an embodiment.

If it is determined that the first system power consumption level is greater than the second system power consumption level, then the method may proceed to the operations in FIG. 3C (e.g., continuing to the box labeled START). Otherwise the method may end following operation 306. If the method ends following operation 306, then the method may be repeated so as to continue monitoring of the power management functionality of the data processing system.

Turning to FIG. 3B, a continuation of the flow diagram of FIG. 3A in accordance with an embodiment is shown.

At operation 320, a timer is started for a predetermined duration of time. The predetermined duration of time may be, for example, 100 milliseconds, 500 milliseconds, 600 milliseconds, 1000 milliseconds, or another duration of time.

At operation 322, the second system power consumption level is monitored. The monitoring may be performed by reading, from one or more power supplies, the second system power consumption level.

At operation 324, it is determined whether the second system power consumption level is less than a threshold. The threshold may be the same threshold of operation 304. If it is determined that the second system power consumption level (e.g., monitored in operation 322) is less than the threshold, then the method may end following operation 324 (e.g., the method may be restated to continue monitoring). Otherwise the method may proceed to operation 326 following operation 326.

At operation 326, it is determined whether the timer has run for the predetermined duration of time. If the time has run for the predetermined duration of time, the method may proceed to operation 328. Otherwise the method may return to operation 322 to continue the monitoring of the second system power consumption level while the timer is running.

At operation 328, the system (e.g., data processing system) is switched from the integrated power manager management of the power in the system to system power manager management of the power in the system. The switch may be performed by (i) disabling, suspending, or otherwise ending power management by the integrated power manager and (ii) beginning power management by the system power manager by having the system power manager instruct (e.g., to limit) various hardware resources with respect to their operation so as to manage the power consumed by these components. For example, the system power manager may monitor the second system power consumption level and send instructions to various hardware resources so that they respective resources consume power at specified rates. By doing so, the system power manager may limit the quantity of power provided by one or more power supplies to be within a predetermined power budget, or other type of power goal.

Figure 3D:
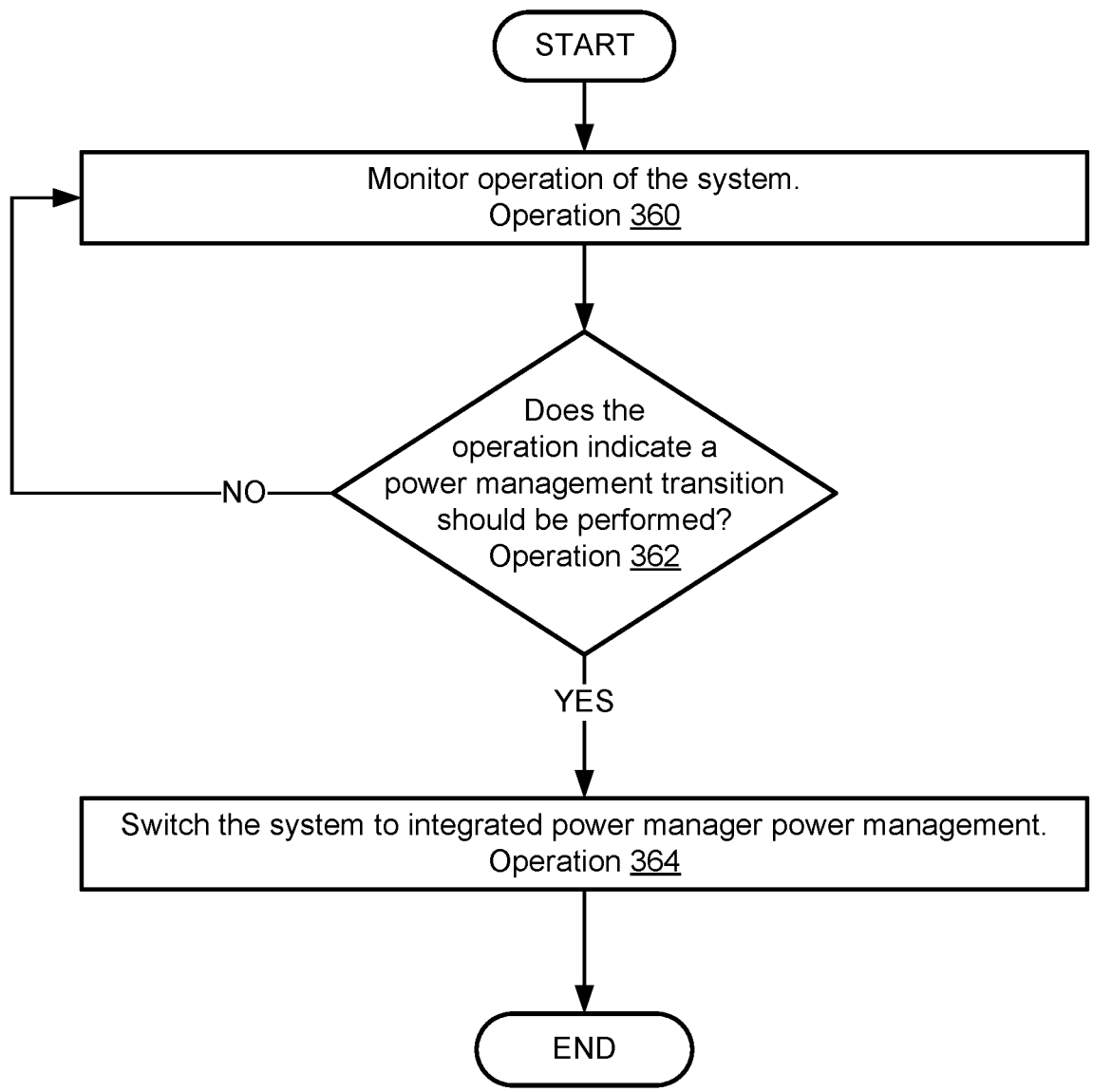
FIG. 3D shows a continuation of the flow diagram illustrated in FIG. 3A in accordance with an embodiment.

The method may proceed to the operations in FIG. 3D (e.g., continuing to the box labeled START) following operation 328. As will be discussed in greater detail below, the operations in FIG. 3D may be used to switch power management of the data processing system back to the integrated power manager in a graceful manner (e.g., one in which it is unlikely that the switch may result in the power consumed/supplied in the system exceeding limits imposed by a power budget, or other type of power goal.

Turning to FIG. 3C, a continuation of the flow diagram of FIG. 3A in accordance with an embodiment is shown.

At operation 340, a power consumption estimate for the system is obtained. The power consumption estimate may be based on the first power consumption level, the second power consumption level, and/or a combination of the two. The power consumption estimate may specify a quantity of power (e.g., estimated to be being supplied by one or more power supplies of the data processing system). In an embodiment, the second power consumption level is used as the power consumption estimate.

At operation 342, it is determined whether the power consumption estimate is greater than a second threshold. The second threshold may be a load threshold, as discussed with respect to FIG. 2B. The load threshold may be, for example, 50% of the maximum power for which the one or more power supplies are rated to provide. If it is determined that the power consumption estimate is greater than the second threshold, then the method may proceed to operation 344. Otherwise the method may end following operation 342 (e.g., the method may be restated to continue monitoring).

At operation 344, it is determined whether the first system power consumption level is greater than the second system power consumption level by a third threshold. The third threshold may be based on the second system power consumption level. For example, the third threshold may be within 10% of the second system power level. In an example, if the second system power consumption level is 1000 watts, then the third threshold may be 1,100 watts (e.g., 10% greater). The third threshold may be the accuracy threshold, discussed with respect to FIG. 2B.

If it is determined that the first system power consumption level is greater than the second system power consumption level by the third threshold, then the method may proceed to operation 346. Proceeding to operation 346 may indicate that the system power manager believes that power consumption reporting hardware is over reporting the power provided by the power supply, which may cause the integrated power manager to throttle power consumption by the hardware resources unnecessarily. Otherwise, the method may end following operation 344.

At operation 346, the system (e.g., data processing system) is switched from the integrated power manager management of the power in the system to system power manager management of the power in the system. The switch may be performed by (i) disabling, suspending, or otherwise ending power management by the integrated power manager and (ii) beginning power management by the system power manager by having the system power manager instruct (e.g., to limit) various hardware resources with respect to their operation so as to manage the power consumed by these components. For example, the system power manager may monitor the second system power consumption level and send instructions to various hardware resources so that they respective resources consume power at specified rates. By doing so, the system power manager may limit the quantity of power provided by one or more power supplies to be within a predetermined power budget, or other type of power goal.

The method may proceed to the operations in FIG. 3D (e.g., continuing to the box labeled START) following operation 346. As will be discussed in greater detail below, the operations in FIG. 3D may be used to switch power management of the data processing system back to the integrated power manager in a graceful manner (e.g., one in which it is unlikely that the switch may result in the power consumed/supplied in the system exceeding limits imposed by a power budget, or other type of power goal.

Turning to FIG. D a continuation of the flow diagram of FIG. 3A in accordance with an embodiment is shown.

At operation 360, operation of the data processing system is monitored. The monitoring may be performed to identify the occurrence of one or more events. Occurrence of one of the events may indicate that power management of the data processing system may be returned to the integrated power manager (e.g., which little risk of failing to meet power budgets or other goals).

In an embodiment, the monitoring is performed based on information included power management repository 226. The power management repository 226 may specify events, ranges, characteristics, and/or other types of features of the data processing system to monitor.

At operation 362, it is determined whether the operation indicates that a power management transition should be performed. The determination may be made when the operation indicates that a prescribed event, range, characteristic or other feature of the operation of the data processing system matches one such characteristic enumerated in the power management repository. If it is determined that the operation indicates that the power management transition should be performed, then the method may proceed to operation 364 following operation 362. Otherwise, the method may return to operation 360 to continue monitoring of the operation of the data processing system.

At operation 364, the system (e.g., data processing system) is switched from the system power manager management of the power in the data processing system to integrated power manager management of the power in the system. The switch may be performed by (i) disabling, suspending, or otherwise ending power management by the system power manager and (ii) beginning power management by the integrated power manager.

The method may end following operation 364. The method may be restarted (e.g., START in FIG. 3A) to continue monitoring operation of the data processing system.

Using the methods illustrated in FIGS. 3A-3D, embodiments disclosed herein may provide for the effective detection of conditions during which power budgets may not properly be enforced and such conditions may be remediated by switching from integrated power manager management of power to system power manager management of power use and/or supply within the system. When it is determined that such conditions exist, the system power manager may specify, instruction, and/or otherwise direct various components in their consumption of power for providing various services. The system power manager may do so in a manner that, for example, decreases performance of one or more hardware resources (e.g., decreasing clock speeds, suspending operation of various processing cores and/or discrete portions of a hardware resource, etc.) thereby reducing power draw from a power supply. Consequently, a power supply may reduce the quantity of power that is providing returning the data processing system to a manner of operation that allows for its operation within the power budgets and/or other power consumption related goals. Further, once it is likely that the conditions giving rise to switching to power management by the system power manager have been remediated, reduced, and/or otherwise are no longer (e.g., likely to be) present, then the system may automatically switch back to integrated power manager management of power by the data processing system.

To further clarify embodiments disclosed herein, diagrams illustrating example blocks and operations are illustrated in FIGS. 4A-4D. These figures illustrate, in part, an example of data processing system 400 (which may be similar to data processing system 100). Data processing system 400 may include hardware resources 402, integrated power manager 404, power supplies 406, power consumption reporting hardware 408, and system power manager 410. These components may be similar to similarly names components shown in FIGS. 1-2A.

Figure 4A:
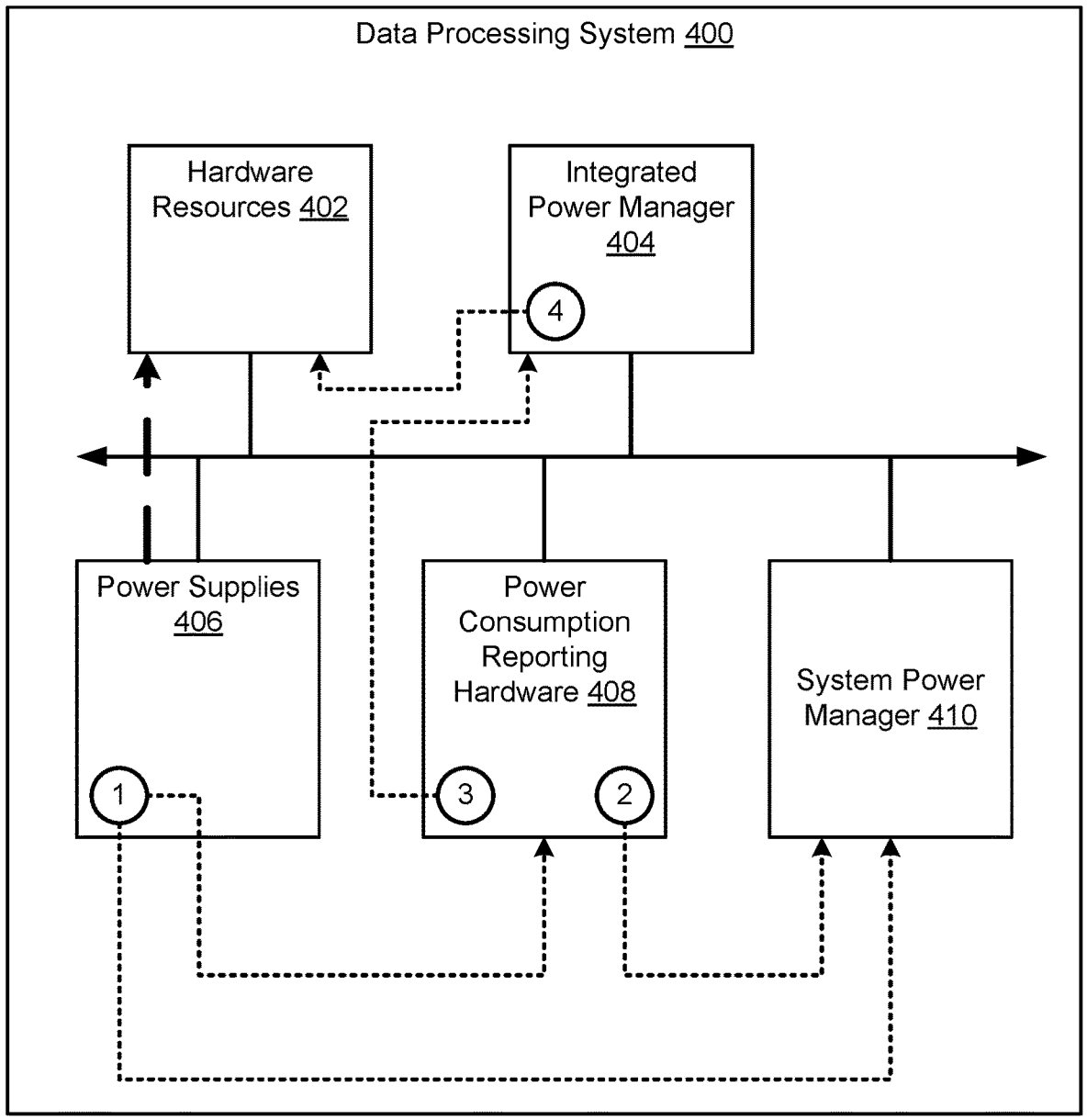
FIGS. 4A-4D are diagrams illustrating an example system at different points in time in accordance with an embodiment.

Turning to FIG. 4A, consider a scenario in which integrated power manager 404 is tasked with managing power supplied by power supplies 406. In FIGS. 4A-4D, power supplies 406 provide hardware resources 402 with power (illustrated with the line having a long dashed tail and terminating in a single arrow, the width of the line in FIG. 4A indicating that a significant quantity of power is being provided to hardware resources 402 from power supplies 406).

As part of its operation, at block 1, power supplies 406 provide power consumption reporting hardware 408 with an analog current signal having a magnitude that is proportional to the quantity of power being supplied by power supplies 406. Power supplies 406 also provide system power manager 410 with a digital representation of the quantity of power being supplied by power supplies 406.

Power consumption reporting hardware 408, at block 3, generates and provides integrated power manager 404 with a scaled, analog voltage representation of the current from power supplies 406 to allow integrated power manager 404 to estimate the quantity of power being provided by power supplies 406.

While power consumption reporting hardware 408 is providing the analog voltage representation, at block 2, system power manager 410 obtains health information regarding power consumption reporting manager 408. In particular, various voltages, currents, register values, and/or other information regarding power consumption reporting hardware 408 is monitored by system power manager 410 to allow system power manager 410 to ascertain whether the analog voltage provided to integrated power manager 404 by power consumption reporting hardware 408 is an accurate representation of the quantity of power supplied by power supplies 406.

While the aforementioned process of health checking performed by system power manager 410, at block 4, integrated power manager 404 may use the quantity of power (e.g., provided by power supplies 406 and determined based on the analog voltage from power consumption reporting hardware 408) to manage the power consumed by hardware resources 402 to meet power budget and/or other power limitations. However, the ability of integrated power manager 404 to manage the power consumed by hardware resources 402 to meet power budgets or other goals may be limited by the accuracy of power reporting by power consumption reporting hardware 408.

Figure 4B:
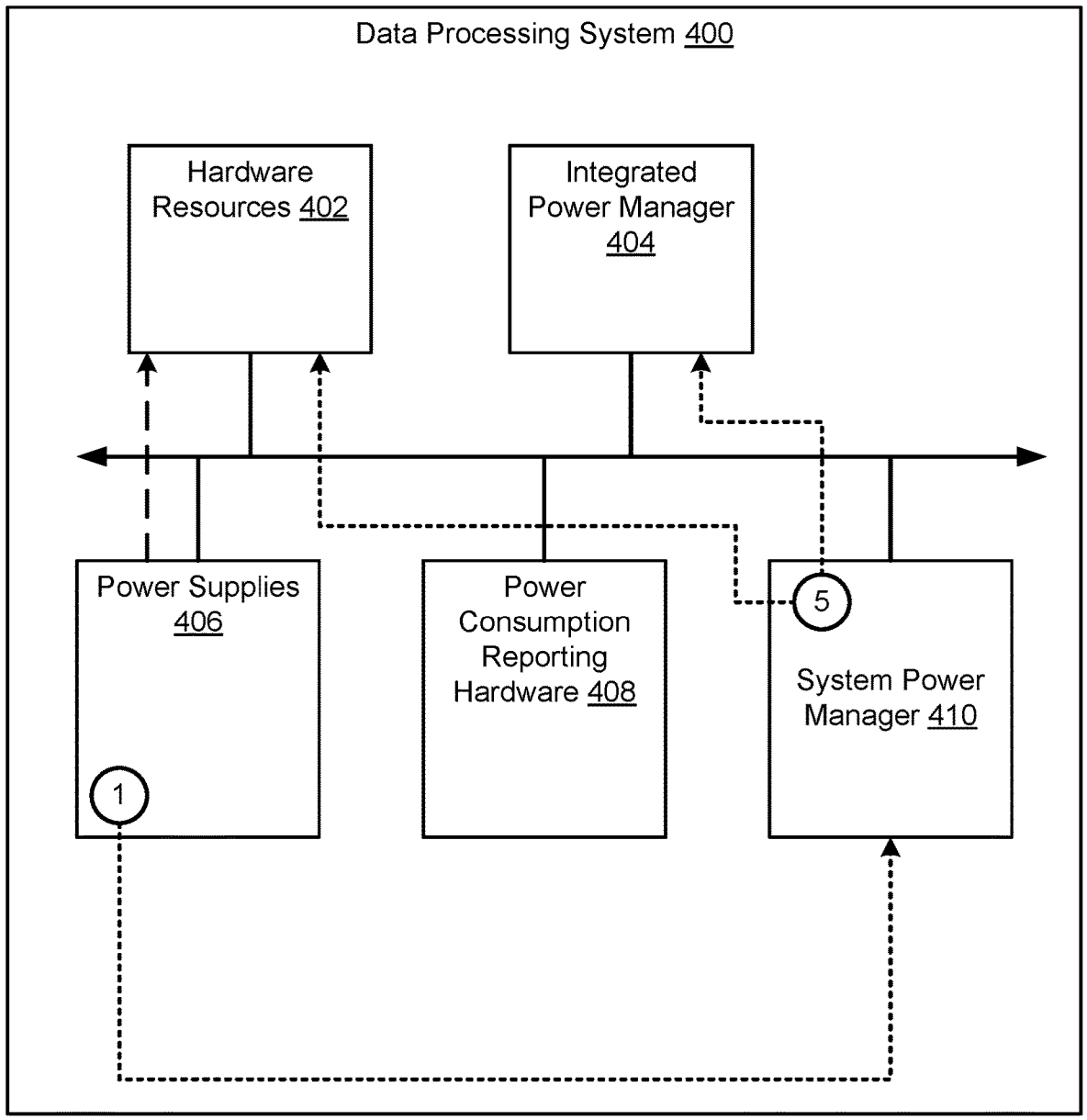

Turning to FIG. 4B, when system power manager 410 determines that power consumption reporting hardware 408 is not accurately reporting the quantity of power supplied by power supplies 406 and/or the quantity of power supplied by power supplies 406 may exceed a power budget or other power goal, then, at block 5, system power manager 410 may disable power management by integrated power manager 404 and may take over power management of hardware resources 402 (e.g., by specifying power consumption limits for one or more components.

Figure 4C:
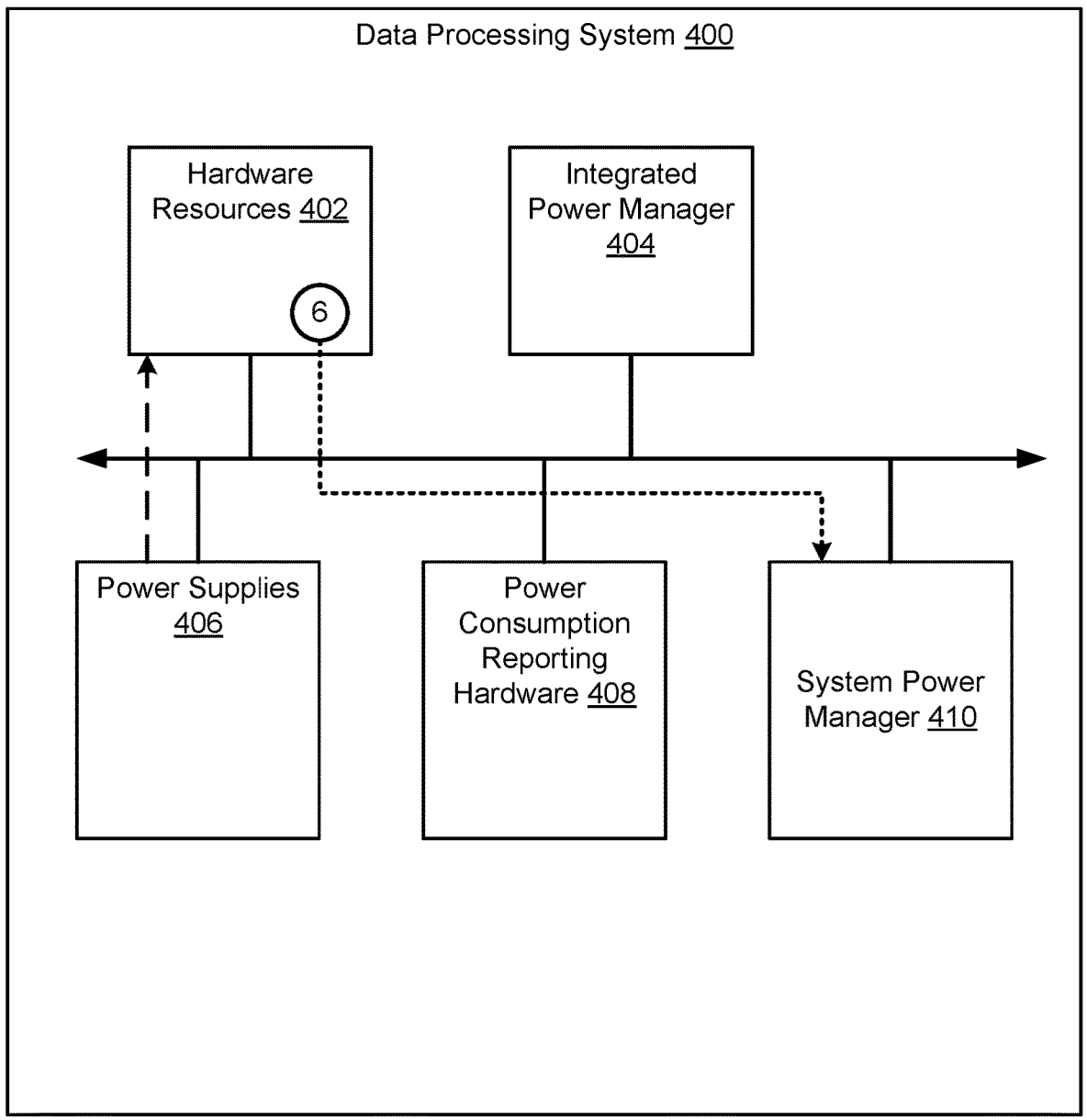

Turning to FIG. 4C, after system power manager 410 takes over power management, at block 6, system power manager 410 may obtain information regarding the operation of data processing system 400 to determine whether to relinquish power management to integrated power manager 404. To do so, system power manager 410 may, for example, monitor the operation of hardware resources 402 to ascertain when such operating conditions (e.g., restarts of data processing system 400) may indicate that power consumption reporting hardware 408 may be more likely to accurate report the quantity of power supplied by power supplies 406 to integrated power manager 404.

Figure 4D:
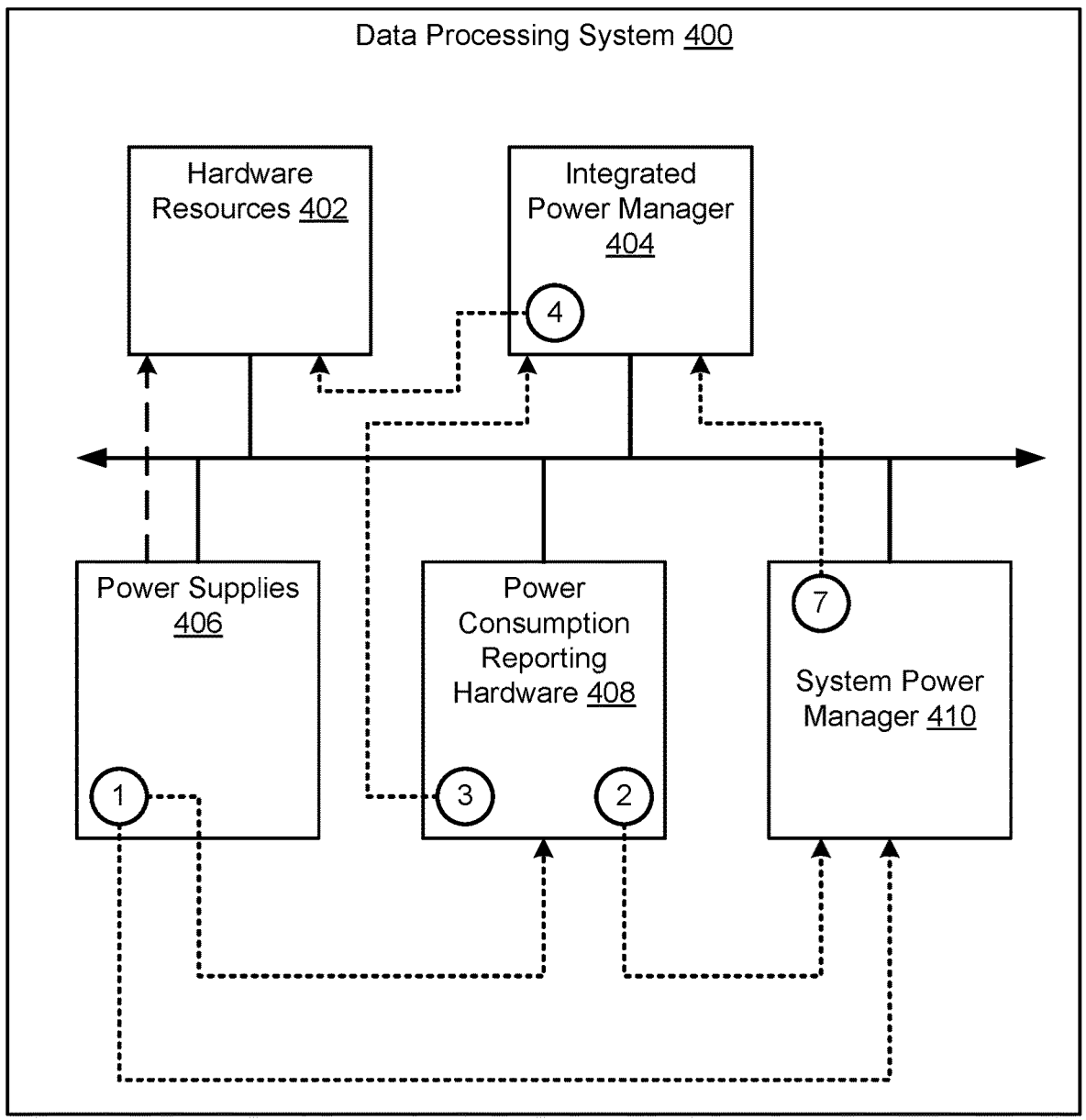

Turning to FIG. 4D, after such operating conditions are identified as having occurred at block 7, system power manager 410 may relinquish power management back to integrated power manager 404 which may return operation of data processing system 400 back to the state as seen in FIG. 4A.

In this manner, inaccurate reporting of consumed power that may cause integrated power manager 404 to either over throttle or fail to limit power consumption by hardware resources 402. Consequently, data processing system 400 may be more likely to stay with power consumption (e.g., power budget) goals.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system to provide computer implemented services, the data processing system comprising:
a power supply adapted to provide power;

power consumption reporting hardware;
hardware resources that consume power supplied by the power supply;
an integrated power manager adapted to:
  manage a quantity of the power supplied by the power supply based on a first system power consumption level reported by the power consumption reporting hardware; and
a system power manager adapted to:
  make a determination, based on the first system power consumption level reported by the power consumption reporting hardware and/or a second system power consumption level reported by the power supply, that a defect in the management of the quantity of the power supplied by the power supply by the integrated power manager is present;
  in response to the determination:
    disable management of the quantity of the power supplied by the power supply by the integrated power management; and
    manage the quantity of the power supplied by the power supply based on the second system power consumption level,
  wherein making the determination comprises:
    making a second determination that the first system power consumption level exceeds the second system power consumption level;
    in response to the second determination:
      identifying whether the second system power consumption level exceeds a threshold, the threshold being based on a percentage of a maximum quantity of consumable power in a power budget for the data processing system;
      when the second system power consumption level exceeds the threshold:
        identifying whether the first system power consumption level exceeds the second system power consumption level by a second threshold, the second threshold being based on a value of the second system power consumption level and a buffer value that causes the second threshold to be greater than the second system power consumption level; and
        making the determination based on the first system power consumption level exceeding the second system power consumption level by the second threshold.

2. The data processing system of claim 1, wherein, in response to the determination, the system power manager is adapted to directly manage the quantity of the power supplied by the power supply based on the second system power consumption level after disabling management of the quantity of the power supplied by the power supply by the integrated power management.

3. The data processing system of claim 1, wherein the integrated power manager and the system power manager are adapted to manage the power supplied by the power supply to within a limit defined by a node lower boundary value, and wherein the node lower boundary value is based on a maximum amount of power the data processing system may consume while fully utilized and fully throttled.

4. The data processing system of claim 1, wherein the system power manager is further adapted to:
  after disabling management of the quantity of the power supplied by the power supply by the integrated power management:
    monitor operation of the data processing system;
    make a third determination, based on the operation of the data processing system, that a power management transition should be performed;
    in response to the third determination:
      initiate management of the quantity of the power supplied by the power supply by the integrated power management; and
      disable management the quantity of the power supplied by the power supply based on the second system power consumption level by the system power manager.

5. The data processing system of claim 4, wherein the third determination is made by comparing events that occur during the monitored operation of the data processing system to a list of events that each indicate that a defect in operation of the power consumption reporting hardware may be remediated.

6. The data processing system of claim 5, wherein the list of events comprises an alternating current cycling of the data processing system, a direct current cycling of the data processing system, an initialization of the system power manager, a firmware update of the system power manager, and a power cycling of the power system manager.

7. The data processing system of claim 1, wherein the power consumption reporting hardware generates the first system power consumption level using an electrical current output from the power supply that varies in magnitude proportionally to a current power output of the power supply, and the power consumption reporting hardware comprises an analog to digital converter to provide the integrated power manager with a digital representation of the current power output of the power supply.

8. The data processing system of claim 7, wherein the system power manager obtains the second system power consumption level using a digital representation of the current power output of the power supply provided by the power supply, wherein the digital representation of the current power output of the power supply is updated less frequently than the electrical current output from the power supply.

9. The data processing system of claim 1, wherein the system power manager comprises an independently operating computing device hosted by the data processing system, and the integrated power manager comprises a function performed by a processor of the data processing system.

10. The data processing system of claim 1, wherein the system power manager and the integrated power manager both manage all of the hardware resources, of the data processing system, that consume power supplied by the power supply.

11. A method of managing power consumption by a data processing system, the method comprising:
  obtaining a first system power consumption level from an integrated power manager of the data processing system;
  obtaining a second system power consumption level from a power supply of the data processing system, the first system power consumption level and the second system power consumption level being substantially identical when the integrated power manager is operating in a predetermined manner;
  making a determination, based on the first system power consumption level and/or the second system power consumption level, that a defect in the management of a quantity of power supplied by the power supply by the integrated power manager is present;
  in response to the determination:

disabling management of the quantity of the power supplied by the power supply by the integrated power management; and
managing the quantity of the power supplied by the power supply based on the second system power consumption level with a system power manager;
wherein making the determination comprises:
making a second determination that the first system power consumption level exceeds the second system power consumption level;
in response to the second determination:
identifying whether the second system power consumption level exceeds a threshold, the threshold being based on a percentage of a maximum quantity of consumable power in a power budget for the data processing system;
when the second system power consumption level exceeds the threshold:
identifying whether the first system power consumption level exceeds the second system power consumption level by a second threshold, the second threshold being based on a value of the second system power consumption level and a buffer value that causes the second threshold to be greater than the second system power consumption level; and
making the determination based on the first system power consumption level exceeding the second system power consumption level by the third threshold.

12. The method of claim 11, wherein the system power manager comprises an independently operating computing device hosted by the data processing system, and the integrated power manager comprises a function performed by a processor of the data processing system.

13. A non-transitory computer readable medium storing instructions that, when executed by a processor, cause a method for managing power consumption by a data processing system to be performed, the method comprising:
obtaining a first system power consumption level from an integrated power manager of the data processing system;
obtaining a second system power consumption level from a power supply of the data processing system the first system power consumption level and the second system power consumption level being substantially identical when the integrated power manager is operating in a predetermined manner;
making a determination, based on the first system power consumption level and/or the second system power consumption level, that a defect in the management of a quantity of power supplied by the power supply by the integrated power manager is present;
in response to the determination:
disabling management of the quantity of the power supplied by the power supply by the integrated power management; and
managing the quantity of the power supplied by the power supply based on the second system power consumption level with a system power manager
wherein making the determination comprises:
making a second determination that the first system power consumption level exceeds the second system power consumption level;
in response to the second determination:
identifying whether the second system power consumption level exceeds a threshold, the threshold being based on a percentage of a maximum quantity of consumable power in a power budget for the data processing system;
when the second system power consumption level exceeds the threshold:
identifying whether the first system power consumption level exceeds the second system power consumption level by a second threshold, the second threshold being based on a value of the second system power consumption level and a buffer value that causes the third threshold to be greater than the second system power consumption level; and
making the determination based on the first system power consumption level exceeding the second system power consumption level by the third threshold.

14. The non-transitory computer readable medium of claim 13, wherein the system power manager comprises an independently operating computing device hosted by the data processing system, and the integrated power manager comprises a function performed by a processor of the data processing system.

15. The method of claim 11, wherein the power consumption reporting hardware generates the first system power consumption level using an electrical current output from the power supply that varies in magnitude proportionally to a current power output of the power supply, and the power consumption reporting hardware comprises an analog to digital converter to provide the integrated power manager with a digital representation of the current power output of the power supply.

16. The method of claim 11, wherein the system power manager comprises an independently operating computing device hosted by the data processing system, and the integrated power manager comprises a function performed by a processor of the data processing system.

17. The method of claim 11, wherein the system power manager and the integrated power manager both manage all of the hardware resources, of the data processing system, that consume power supplied by the power supply.

18. The non-transitory computer readable medium of claim 13, wherein the power consumption reporting hardware generates the first system power consumption level using an electrical current output from the power supply that varies in magnitude proportionally to a current power output of the power supply, and the power consumption reporting hardware comprises an analog to digital converter to provide the integrated power manager with a digital representation of the current power output of the power supply.

19. The non-transitory computer readable medium of claim 13, wherein the system power manager comprises an independently operating computing device hosted by the data processing system, and the integrated power manager comprises a function performed by a processor of the data processing system.

20. The non-transitory computer readable medium of claim 13, wherein the system power manager and the integrated power manager both manage all of the hardware resources, of the data processing system, that consume power supplied by the power supply.

* * * * *